US012750143B2

United States Patent

(12) United States Patent
(10) Patent No.: US 12,750,143 B2
(45) Date of Patent: Sep. 29, 2026

Drooghaag et al.

(54) PREDICTION OF A METRIC OF QUALITY OF A NETWORK

(71) Applicant: Nokia Solutions and Networks Oy, Espoo (FI)

(72) Inventors: Benoit M. Drooghaag, Antwerp (BE); Tom M. Bostoen, Antwerp (BE)

(73) Assignee: Nokia Solutions and Networks Oy, Espoo (FI)

(*) Notice: Subject to any disclaimer, the term of this patent is extended or adjusted under 35 U.S.C. 154(b) by 475 days.

(21) Appl. No.: 18/454,934

(22) Filed: Aug. 24, 2023

(65) Prior Publication Data

US 2024/0072914 A1 Feb. 29, 2024

(30) Foreign Application Priority Data

Aug. 25, 2022 (EP) .................................... 22192130

(51) Int. Cl.

| | |
|---|---|
| ***H04B 17/309*** | (2015.01) |
| ***H04L 43/0894*** | (2022.01) |
| ***H04Q 11/00*** | (2006.01) |
| ***H04W 16/22*** | (2009.01) |

(52) U.S. Cl.

CPC ....... *H04B 17/309* (2015.01); *H04L 43/0894* (2013.01); *H04Q 11/0067* (2013.01); *H04W 16/22* (2013.01)

(58) Field of Classification Search

CPC ... H04L 1/1819; H04L 1/1845; H04L 1/1896; H04L 2001/0097; H04L 2001/0092; H04L 1/1822; H04L 1/1812; H04W 4/40; H04W 72/23; H04W 92/18

USPC .......................................................... 370/252

See application file for complete search history.

(56) References Cited

U.S. PATENT DOCUMENTS

2018/0204129 A1* 7/2018 Vasseur .................. G06N 20/00
2024/0040400 A1* 2/2024 Cionca .................. H04W 16/22

* cited by examiner

*Primary Examiner* — Kwang B Yao
*Assistant Examiner* — Syed M Bokhari
(74) *Attorney, Agent, or Firm* — Harness, Dickey & Pierce, P.L.C.

(57) ABSTRACT

An apparatus (100) for building a prediction model comprises means for collecting a plurality of high-paced telemetry traffic measurement values (4) representing traffic rates observed in a shared medium of the point-to-multipoint telecommunications network (1), means for fitting at least one traffic model (5) using the plurality of high-paced telemetry traffic measurement values (4) and computing at least one simulated value of the metric of the quality of the point-to-multipoint telecommunications network using the traffic model (5), wherein the metric of the quality relates to at least one individual user, and means for training a prediction model (7) on a simulated dataset (6), wherein the simulated dataset (6) comprises the descriptor of at least one network configuration and the at least one simulated value of the metric of the quality of the point-to-multipoint telecommunications network, the prediction model (7) being configured to compute the value of the metric of the quality of the point-to-multipoint telecommunications network.

15 Claims, 6 Drawing Sheets

PREDICTION OF A METRIC OF QUALITY OF A NETWORK

FIELD

The disclosure relates to apparatuses and methods for predicting a metric of quality of a network, in particular a telecommunications network.

BACKGROUND

Monitoring metrics of a quality of a network, especially a telecommunications network, is a task of the utmost importance in order to ensure customer satisfaction and that the quality of the network is as advertised.

Some metrics cannot be efficiently monitored for every user at the same time. One such metric is a speedtest rate or a speedtest success. A speedtest measures the time it takes to download a certain amount of data from the Internet. Such a measure cannot be conducted on every user of a telecommunications network at the same time, due to a generation of real traffic on the telecommunications network and a risk of saturation.

A solution is to resort to a heuristic approach by ensuring such a level of capacity in the network that most speedtests succeed. However, such an approach results in a waste of capacity and does not even ensure that users receive the appropriate quality of service in some extreme scenarios.

SUMMARY

In some example embodiments, the disclosure provides an apparatus for building a prediction model adapted to predict a value of a metric of a quality of a point-to-multipoint telecommunications network.

The apparatus may comprise means for:

Collecting a plurality of high-paced telemetry traffic measurement values representing traffic rates observed in a shared medium of the point-to-multipoint telecommunications network, wherein the shared medium is shared by a plurality of users of the point-to-multipoint telecommunications network and wherein the high-paced telemetry traffic measurement values represent traffic rates attributed to individual users among the plurality of users, Fitting at least one traffic model using the plurality of high-paced telemetry traffic measurement values and computing at least one simulated value of the metric of the quality of the point-to-multipoint telecommunications network using the traffic model and a descriptor of at least one network configuration, wherein the metric of the quality of the point-to-multipoint telecommunications network relates to at least one individual user of the point-to-multipoint telecommunications network, and Training a prediction model on a simulated dataset, wherein the simulated dataset comprises the descriptor of at least one network configuration and the at least one simulated value of the metric of the quality of the point-to-multipoint telecommunications network, the prediction model being configured to compute the value of the metric of the quality of the point-to-multipoint telecommunications network.

In some example embodiments, the disclosure also provides a method for building a prediction model adapted to predict a value of a metric of a quality of a point-to-multipoint telecommunications network, the method comprising the steps of:

Collecting a plurality of high-paced telemetry traffic measurement values representing traffic rates observed in a shared medium of the point-to-multipoint telecommunications network, wherein the shared medium is shared by a plurality of users of the point-to-multipoint telecommunications network and wherein the high-paced telemetry traffic measurement values represent traffic rates attributed to individual users among the plurality of users, Fitting at least one traffic model using the plurality of high-paced telemetry traffic measurement values and computing at least one simulated value of the metric of the quality of the point-to-multipoint telecommunications network using the traffic model and a descriptor of at least one network configuration, wherein the metric of the quality of the point-to-multipoint telecommunications network relates to at least one individual user of the point-to-multipoint telecommunications network, Training a prediction model on a simulated dataset, wherein the simulated dataset comprises the descriptor of at least one network configuration and the at least one simulated value of the metric of the quality of the point-to-multipoint telecommunications network, the prediction model being configured to compute the value of the metric of the quality of the point-to-multipoint telecommunications network.

According to embodiments, such an apparatus or a method may comprise one or more of the features below.

In an embodiment, the plurality of high-paced telemetry traffic measurement values is retrieved from a minority of users of the point-to-multipoint telecommunications network.

In an embodiment, the descriptor of at least one network configuration comprises at least one value relating to a dynamic bandwidth management system.

In an embodiment, the at least one simulated value of the metric of the quality of the point-to-multipoint telecommunications network comprises a plurality of simulated values of the metric of the quality of the point-to-multipoint telecommunications network, wherein the metric of the quality of the point-to-multipoint telecommunications network is selected in the group consisting of data rates, latencies and speedtest results.

In an embodiment, the apparatus further comprises means for:

Extracting a plurality of elementary segments from the plurality of high-paced telemetry traffic measurement values, Clustering the plurality of elementary segments into a plurality of clusters of elementary segments, and Fitting a plurality of cluster traffic models on the plurality of clusters of elementary segments.

The at least one simulated value of the metric of the quality of the point-to-multipoint telecommunications network may be computed using one or more of the plurality of cluster traffic models and the descriptor of one or more network configurations.

In an embodiment, the at least one traffic model comprises a Discrete Auto Regressive model.

In an embodiment, the at least one network configuration comprises a plurality of network configurations and the at least one simulated value of the metric of the quality of the point-to-multipoint telecommunications network comprises a plurality of simulated values of the metric of the quality of the point-to-multipoint telecommunications network.

In an embodiment, the prediction model comprises a classifier and/or a regression model.

In an embodiment, the prediction model computes a probability of success of a speedtest and/or a speedtest rate.

In an embodiment, the point-to-multipoint telecommunications network is a Passive Optical Network.

According to an embodiment, an apparatus for building a prediction model adapted to predict a value of a metric of a quality of a point-to-multipoint telecommunications network, comprises:

Collecting circuitry for collecting a plurality of high-paced telemetry traffic measurement values representing traffic rates observed in a shared medium of the point-to-multipoint telecommunications network, wherein the shared medium is shared by a plurality of users of the point-to-multipoint telecommunications network and wherein the high-paced telemetry traffic measurement values represent traffic rates attributed to individual users among the plurality of users, Fitting circuitry for fitting at least one traffic model using the plurality of high-paced telemetry traffic measurement values and computing at least one simulated value of the metric of the quality of the point-to-multipoint telecommunications network using the traffic model and a descriptor of at least one network configuration, wherein the metric of the quality of the point-to-multipoint telecommunications network relates to at least one individual user of the point-to-multipoint telecommunications network, and Training circuitry for training a prediction model on a simulated dataset, wherein the simulated dataset comprises the descriptor of at least one network configuration and the at least one simulated value of the metric of the quality of the point-to-multipoint telecommunications network, the prediction model being configured to compute the value of the metric of the quality of the point-to-multipoint telecommunications network.

According to an embodiment, an apparatus for building a prediction model adapted to predict a value of a metric of a quality of a point-to-multipoint telecommunications network, comprises at least one processor; and at least one memory storing instructions that, when executed by the at least one processor, cause the apparatus at least to perform:

Collecting a plurality of high-paced telemetry traffic measurement values representing traffic rates observed in a shared medium of the point-to-multipoint telecommunications network, wherein the shared medium is shared by a plurality of users of the point-to-multipoint telecommunications network and wherein the high-paced telemetry traffic measurement values represent traffic rates attributed to individual users among the plurality of users, Fitting at least one traffic model using the plurality of high-paced telemetry traffic measurement values and computing at least one simulated value of the metric of the quality of the point-to-multipoint telecommunications network using the traffic model and a descriptor of at least one network configuration, wherein the metric of the quality of the point-to-multipoint telecommunications network relates to at least one individual user of the point-to-multipoint telecommunications network, and Training a prediction model on a simulated dataset, wherein the simulated dataset comprises the descriptor of at least one network configuration and the at least one simulated value of the metric of the quality of the point-to-multipoint telecommunications network, the prediction model being configured to compute the value of the metric of the quality of the point-to-multipoint telecommunications network.

In some example embodiments, the disclosure also provides an apparatus for predicting a value of a metric of a quality of a point-to-multipoint telecommunications network, the apparatus comprising means for:

Collecting a real-time telemetry traffic measurement value,

Using the prediction model built according to the above-mentioned method to predict a value of the metric of the quality of the point-to-multipoint telecommunications network.

In some example embodiments, the disclosure also provides a method for predicting a value of a metric of a quality of a point-to-multipoint telecommunications network, the method comprising the steps of:

Collecting a real-time telemetry traffic measurement value,

Using the prediction model built according to the above-mentioned method to predict a value of the metric of the quality of the point-to-multipoint telecommunications network.

In an embodiment, an apparatus for predicting a value of a metric of a quality of a point-to-multipoint telecommunications network, comprises:

Collecting circuitry for collecting a real-time telemetry traffic measurement value, Predicting circuitry for using the prediction model built according to the above-mentioned method to predict a value of the metric of the quality of the point-to-multipoint telecommunications network.

In an embodiment, an apparatus for predicting a value of a metric of a quality of a point-to-multipoint telecommunications network, comprises at least one processor; and at least one memory storing instructions that, when executed by the at least one processor, cause the apparatus at least to perform:

collecting a real-time telemetry traffic measurement value, using the prediction model built according to the above-mentioned method to predict a value of the metric of the quality of the point-to-multipoint telecommunications network.

BRIEF DESCRIPTION OF THE DRAWINGS

These and other aspects of the invention will be apparent from and elucidated with reference to example embodiments described hereinafter, by way of example, with reference to the drawings.

DETAILED DESCRIPTION OF THE EMBODIMENTS

Figure 1:
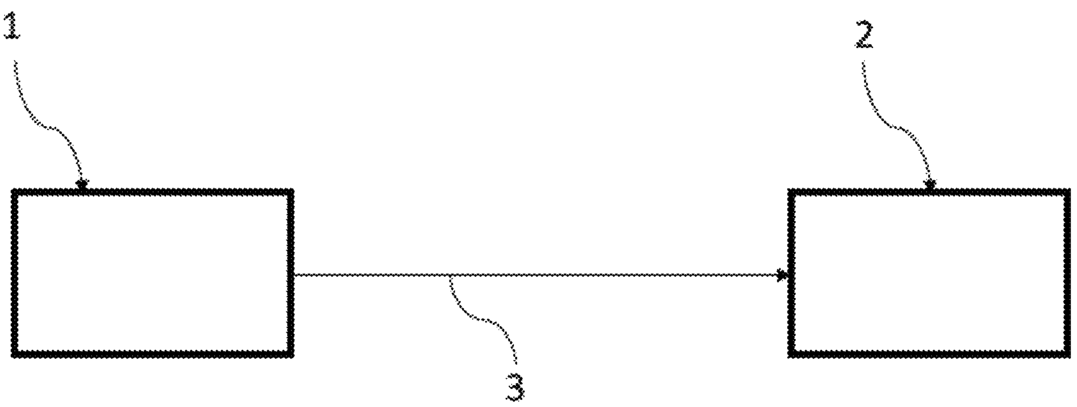
FIG. 1 represents a schematic view of a telecommunications network in connection with a remote or cloud infrastructure.

With reference to FIG. 1, a telecommunications network 1 is in communication with a remote infrastructure 2, the remote infrastructure 2 being on-premise or being deployed in a cloud. The telecommunications network 1 transmits a telemetry data stream 3 to the remote infrastructure 2, the telemetry data stream 3 including time series data associated with each user of the telecommunications network 1.

The telemetry data stream 3 may be slow-paced or high-paced. According to one embodiment, the telemetry data stream 3 transmits new data points with a period of five minutes. However, the telemetry data stream 3 may be high-paced and may transmit new data points with a period of five to ten seconds.

The remote infrastructure 2 may process the telemetry data stream 3 in order to estimate or compute one or several metrics pertaining to a quality of service in the telecommunications network 1.

The telecommunications network 1 comprises a shared medium serving a plurality of users. The telecommunications network 1 may be a fiber-optic communication network, a radio network, a coaxial network, a mobile network. The shared medium of the telecommunications network may include an optical fiber, a radio link, a wavelength channel, a frequency channel, a coaxial cable and so on.

Figure 2:
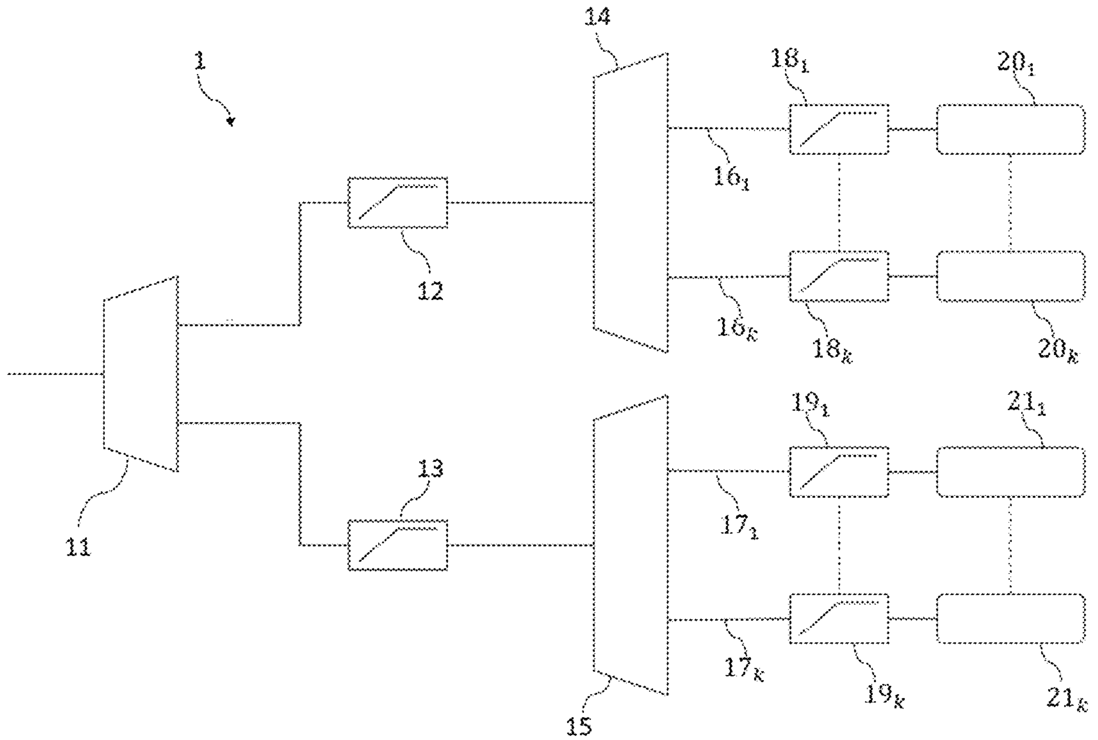
FIG. 2 represents a schematic view of a passive optical network.

With reference to FIG. 2, according to an embodiment, the telecommunications network 1 may be a Passive Optical Network (PON). The Passive Optical Network is considered a "last-mile network" and is tasked with providing a service to users. The Passive Optical Network may contain one or more slices, each of the one or more slices corresponding to a Virtual Network Operator (VNO). According to an embodiment, the telecommunications network 1 comprises a first slice and a second slice.

A PON scheduler 11 distributes a bandwidth between the first slice and the second slice, using static weights or dynamic weights. Dynamic weights may be computed by a Dynamic Bandwidth Management system.

The first slice comprises a first slice traffic shaper 12, the first slice traffic shaper 12 being configured to limit a bitrate in the first slice. A first slice scheduler 14 is configured to distribute the bandwidth between a plurality of first optical connections $\mathbf{16}_1, \ldots, \mathbf{16}_k$.

The plurality of first optical connections $\mathbf{16}_1, \ldots, \mathbf{16}_k$ connects the first slice scheduler 14 to a plurality of first endpoints $\mathbf{20}_1, \ldots, \mathbf{20}_k$, wherein each of the plurality of first endpoints $\mathbf{20}_1, \ldots, \mathbf{20}_k$ corresponds to a user.

A plurality of first connection traffic shapers $\mathbf{18}_1, \ldots, \mathbf{18}_k$ is placed on the plurality of first optical connections $\mathbf{16}_1, \ldots, \mathbf{16}_k$. The plurality of first connection traffic shapers $\mathbf{18}_1, \ldots, \mathbf{18}_k$ is configured to set a maximum bitrate to each of the plurality of first optical connections $\mathbf{16}_1, \ldots, \mathbf{16}_k$, the maximum bitrate not being necessarily identical across the plurality of first optical connections $\mathbf{16}_1, \ldots, \mathbf{16}_k$.

The second slice comprises a second slice traffic shaper 13, the second slice traffic shaper 13 being configured to limit a bitrate in the second slice. The second slice scheduler 15 is configured to distribute the bandwidth between a plurality of second optical connections $\mathbf{16}_1, \ldots, \mathbf{16}_k$. A number of second optical connections may or may not be identical to a number of first optical connections.

The plurality of second optical connections $\mathbf{16}_1, \ldots, \mathbf{16}_k$ connects the second slice scheduler 15 to a plurality of second endpoints $\mathbf{21}_1, \ldots, \mathbf{21}_k$, wherein each of the plurality of second endpoints $\mathbf{21}_1, \ldots, \mathbf{21}_k$ corresponds to a user.

A plurality of second connection traffic shapers $\mathbf{19}_1, \ldots, \mathbf{19}_k$ is placed on the plurality of second optical connections $\mathbf{17}_1, \ldots, \mathbf{17}_k$. The plurality of second connection traffic shapers $\mathbf{19}_1, \ldots, \mathbf{19}_k$ is configured to set a maximum bitrate to each of the plurality of second optical connections $\mathbf{17}_1, \ldots, \mathbf{17}_k$, the maximum bitrate not being necessarily identical across the plurality of second optical connections $\mathbf{17}_1, \ldots, \mathbf{17}_k$.

The PON scheduler 11, the first slice scheduler 14 and the second slice scheduler 15 may rely on static weights and/or dynamic weights. Dynamic weights may be computed by the Dynamic Bandwidth Management system. The PON scheduler 11, the first slice scheduler 14 and the second slice scheduler 15 may resort to fair-queue algorithms, such as the Generalized Process Sharing Algorithm.

The telecommunications network comprising a shared medium, a metric of quality of service may be measured for individual users of the telecommunications network. The metric of quality of service may be a data rate or a latency for one or more individual users of the telecommunications network, for example.

The metric of quality of service may be measured instantaneously or averaged over a chosen length of time. The metric of quality of service may also be measured for an individual user or averaged over a group of users.

Instead of measuring the metric of quality of service, a prediction model may be used within a prediction apparatus. The prediction apparatus is configured to predict values of the metric of quality of service in real-time for a large number of users at the same time, whereas a measurement of the metric of quality of service is sometimes not scalable.

Figure 3:
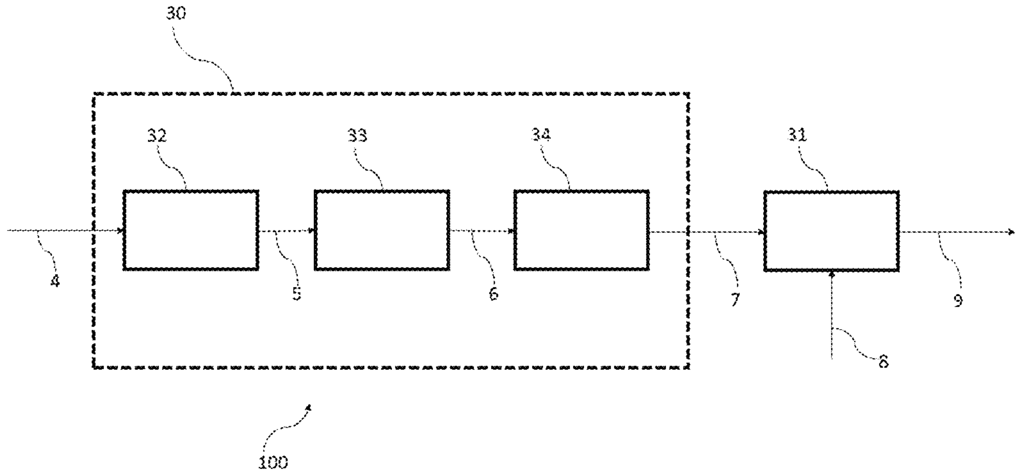
FIG. 3 represents a schematic view of a speedtest prediction apparatus according to an embodiment.

With reference to FIG. 3, a speedtest prediction apparatus 100 is represented.

A speedtest measures a data rate on a connection of an individual user to the telecommunications network by downloading a certain amount of data from a server. The speedtest is deemed successful or not depending on a downloading speed.

Speedtests are a widespread metric of the quality of the connection to the telecommunications network. A common criterion for a satisfying quality of the connection of the telecommunications network overall is if 80% of an advertised datarate is available 80% of the time. Any other percentages may be considered. However, speedtests are not scalable and cannot be carried out on every user of the telecommunications network at the same time. Thus, the speedtest prediction apparatus 100 may help estimate speedtest results for every user of the telecommunications network 1.

The speedtest prediction apparatus 100 comprises a model-building module 30 and an inference module 31. The model-building module 30 may be offline and is configured to train a speedtest prediction model 7. The inference module 31 is an online module and is configured to predict values 9 of a speedtest for a plurality of users, using the speedtest prediction model 7 and a telemetry data stream 8.

The model-building module 30 receives a high-paced telemetry dataset 4. The high-paced telemetry dataset 4 is a set of pre-registered time-series of traffic measurement over time (i.e. bitrates), each of the pre-registered time series corresponding to an individual user among the users.

The pre-registered time series may have different lengths or starting times and may have a duration ranging from a day to approximately a week. The pre-registered time series are sampled with a high frequency. According to an embodiment, a sampling period is five seconds.

The minority of users is chosen to be representative of the entirety of users of the network. This might be made by studying metadata associated with the users. A sample size of the minority of users is chosen so that the high-paced telemetry dataset is statistically significant.

However, the sample size is still very small compared to an overall number of users of the telecommunications network 1. The minority of users may represent from one hundredth to one thousandth of the users of the telecommunications network 1, or from a few hundreds to a few thousand users.

The model-building module 30 comprises a traffic modelling module 32, a simulation module 33 and a training module 34.

The traffic modelling module 32 receives the high-paced telemetry dataset 4 and outputs at least one traffic model 5. The traffic model 5 is a mathematical model fitted on the high-paced telemetry dataset 4.

The traffic modelling module 32 may fit the traffic model 5 to the high-paced telemetry dataset 4 on a Discrete Auto-Regressive model using the Yule-Walker equations. The traffic model 5 may also be fitted on generative models such as auto-encoders or Generative Adversarial Network. Finally, known parametric models may be used, such as Hidden Markov models and Fractional Gaussian Noise models.

The traffic model 5 is then transmitted and integrated into the simulation module 33. The simulation module 33 is configured to generate synthetic data traces using the traffic model and to compute simulated speedtest results under different starting conditions.

A synthetic traffic dataset 6 comprises the simulated speedtest results associated to the different starting conditions. The synthetic traffic dataset 6 is then transmitted to the training module 34.

The training module 34 trains the speedtest prediction model 7 using the synthetic traffic dataset 6, so that the speedtest prediction model 7 learns to predict speedtest values 9 under various starting conditions.

The speedtest prediction model 7 may be a classification model, for example a Support Vector Machine. Alternatively, other classification algorithms may be used in order to classify the speedtest as either a success or a failure. For example, Naïve Bayes, logistic regression or a neural network classifier may be used.

The speedtest prediction model 7 may also be a regression model, for example an isotonic regression. Alternatively, other regression algorithms may be used in order to predict a speedtest rate. For example, a linear regression model, a decision tree regression model or a neural network regression model may be used.

Figure 4:
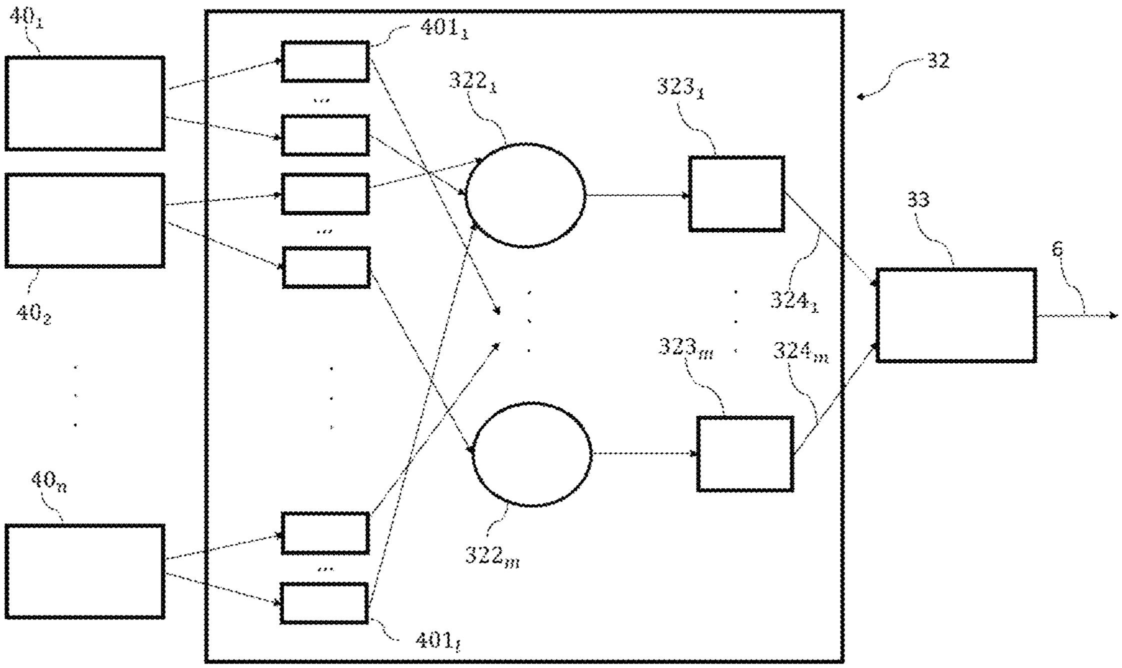
FIG. 4 represents a schematic view of a traffic modelling module being used in the speedtest prediction apparatus according to an embodiment.

With reference to FIG. 4, an embodiment of the traffic modelling module 32 is represented. According to this embodiment, the traffic modelling module 32 is configured to perform segmentation and clustering of the high-paced telemetry data 4.

In this embodiment, the high-paced telemetry dataset 4 comprises a plurality of high-paced telemetry time-series $\mathbf{40}_1, \ldots, \mathbf{40}_n$. A plurality of elementary segments $\mathbf{401}_1, \ldots, \mathbf{401}_l$ is extracted from the plurality of high-paced telemetry time-series $\mathbf{40}_1, \ldots, \mathbf{40}_n$.

According to an embodiment, the plurality of elementary segments $\mathbf{401}_1, \ldots, \mathbf{401}_l$ corresponds to a data consumption profile associated with a certain activity (such as working, streaming, etc.).

The plurality of elementary segments $\mathbf{401}_1, \ldots, \mathbf{401}_l$ is collected across the plurality of high-paced telemetry time-series $\mathbf{40}_1, \ldots, \mathbf{40}_n$ and may be a subset of the plurality of high-paced telemetry time-series $\mathbf{40}_1, \ldots, \mathbf{40}_n$. A number of elementary segments extracted from each of the plurality of high-paced telemetry time-series $\mathbf{40}_1, \ldots, \mathbf{40}_n$ may vary.

The elementary segments all have a same duration (e.g. 15 mins). They are taken over the entire traffic trace excepted when the traffic is very low (typically during the night).

The plurality of elementary segments $\mathbf{401}_1, \ldots, \mathbf{401}_l$ is then grouped into a plurality of clusters $\mathbf{322}_1, \ldots, \mathbf{322}_m$. The clusters are chosen using clustering algorithms and usual time-series clustering techniques.

Dimensionality reduction algorithms may be used, for example Principal Components Analysis.

Clustering algorithms may be used, for example K-means, Local Outlier Factor or other usual clustering algorithms adapted for time series. Dynamic time warping or Euclidian matching may be used.

A plurality of elementary traffic model-fitting modules $\mathbf{323}_1, \ldots, \mathbf{323}_m$ fits a model on each of the plurality of clusters $\mathbf{322}_1, \ldots, \mathbf{322}_m$. A plurality of elementary traffic models $\mathbf{324}_1, \ldots, \mathbf{324}_m$ is then transmitted to the simulation module 33 for data synthesis, the simulation module 33 outputting the synthetic traffic dataset 6.

Figure 5:
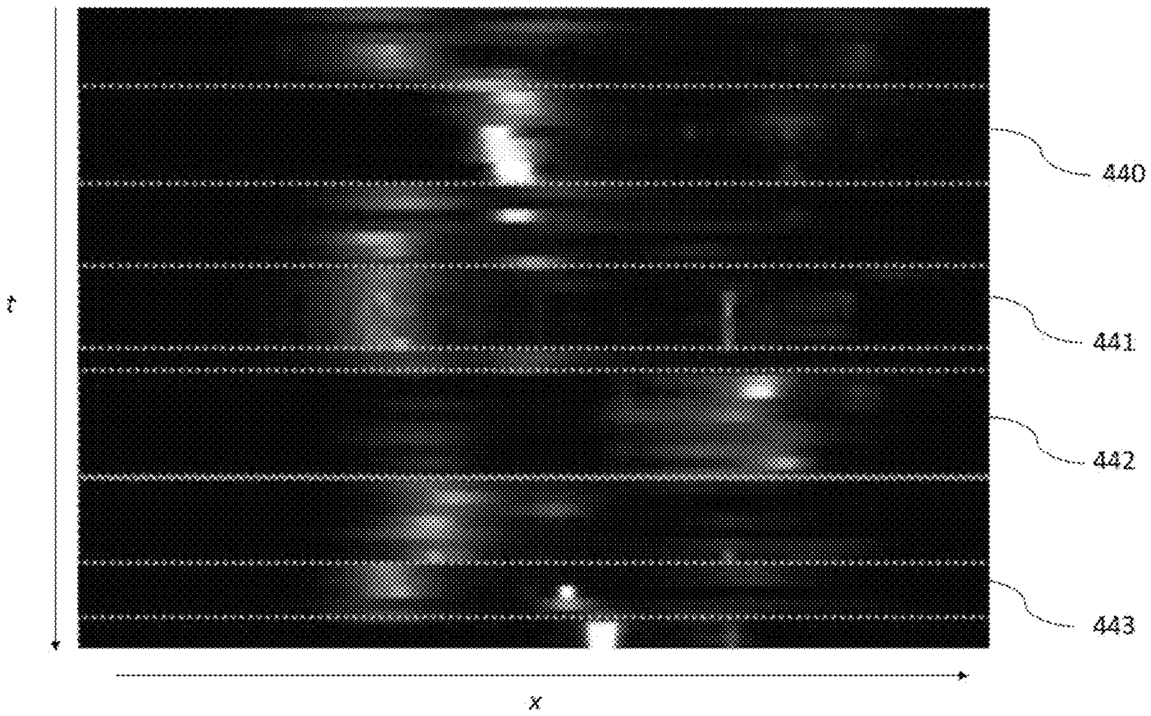
FIG. 5 represents graphic inputs and outputs of the traffic modelling module according to an embodiment.

With reference to FIG. 5, an example of a high-paced telemetry traffic trace is shown for an example user for a day. Four clusters 440, 441, 442 and 443 are extracted from the high-paced telemetry traffic trace. x represents the bitrate level and t is the time of the day at which the elementary segments are measured. The grey scale represents the magnitude of the marginal distribution of the bitrate, i.e. how often a bitrate of level x has been measured during the elementary segment capture at time t.

Figure 6:
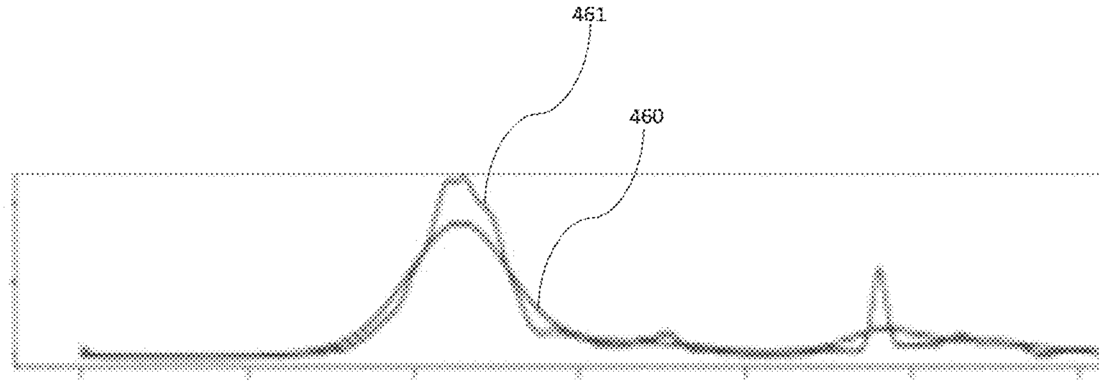
FIG. 6 represents a schematic view of a simulation module being used in the speedtest prediction apparatus according to an embodiment.

With reference to FIG. 6, a step of model fitting is represented. A measured marginal distribution of traffic level 460 is represented and used to fit a traffic model and generate a simulated distribution of traffic level 461.

Figure 7:
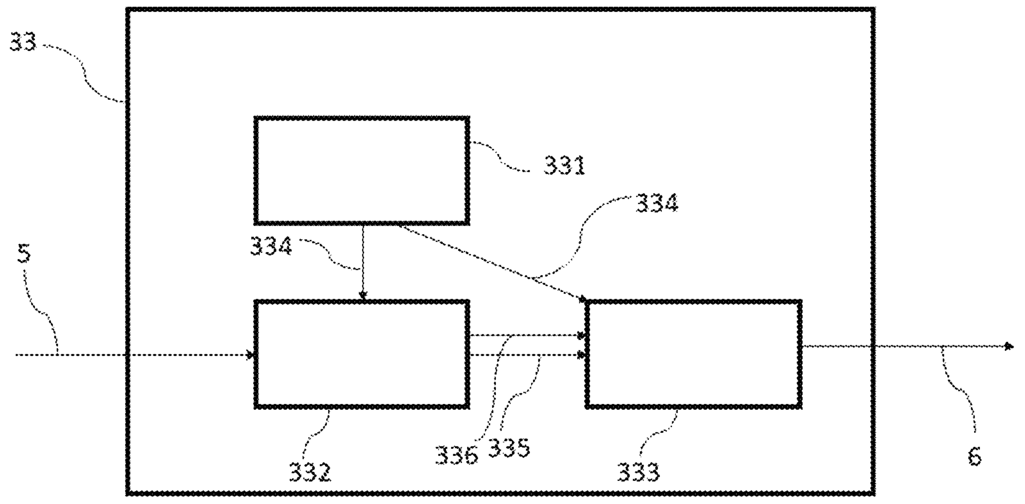
FIG. 7 represents a schematic view of an inference module of the speedtest prediction apparatus.

With reference to FIG. 7, the simulation module 33 is described in details. The simulation module 33 receives the traffic model 5 which, according to an embodiment, might be the plurality of elementary traffic models $\mathbf{324}_1, \ldots, \mathbf{324}_m$.

A simulation environment 332 integrates the traffic model 5 and performs a plurality of network simulations, e.g. a very large number of network simulations, which may be hundreds of thousands. An initializing module 331 initializes a set of configuration parameters 334 randomly and transmits the set of configuration parameters 334 to the simulation environment 332.

The set of configuration parameters 334 may comprise:
- A number of slices in the telecommunications network 1,
- A number of users in each of the slices, which may typically range from 1 to 128,
- In an embodiment wherein the traffic model 5 comprises the elementary traffic models $324_1, \ldots, 324_m$, an association parameter indicating an elementary traffic model for each of the users,
- An average throughput level for each of the subscribers,
- A maximum bitrate for each of the subscriber, the maximum bitrate being configured by traffic shapers placed on optical connections,
- A static weight for each of the subscribers, the static weight being configured by slice schedulers on each of the slices,
- A maximum bitrate for each of the slices, the maximum bitrate being configured by slice traffic shapers placed on each of the slices,
- A static weight for each of the slices, the static weight being configured by a PON scheduler, in an embodiment where the telecommunications network 1 is a Passive Optical Network,
- An optional scheduler weight and/or shaper reduction that would be applied depending on the Dynamic Bandwidth Management system, i.e. scheduler weight limits imposed by the schedulers 11, 14 and/or 15 and/or traffic limits imposed by the traffic shapers 12, 13, 18 and/or 19.

The traffic model 5 is used to generate synthetic data for the virtual users in each of the high number of network simulations. The network simulations are transient and high-paced, and have a timestep similar to a period of the high-paced telemetry data, for example, five seconds. The timestep is lower than a typical speedtest duration, the typical speedtest duration being approximately thirty seconds.

For each of the network simulations, a simulated network is initialized. The simulated network may comprise at least one traffic source, at least one traffic shaper and at least one fair queue scheduler, wherein the traffic source generates an in-flow through the simulated network. The simulated network is initialized with the set of configuration parameters 334.

A simulated duration in the simulated network may range from a few minutes to several hours, so that relevant activity patterns may be witnessed. A virtual speedtest user is designated among the virtual users.

According to an embodiment, a plurality of virtual speedtest users is designated at once. According to an embodiment, the virtual speedtest user or the plurality of virtual speedtest users is chosen at random.

Each network simulation generates synthetic high-paced traffic traces for each virtual user and derives simulated speedtest values 335 for each virtual speedtest user. Simulated speedtest values 335 are computed and transmitted to a dataset-building module 333.

The simulation environment 332 also produces a slow-paced telemetry information 336 by performing moving averages on the synthetic high-paced traffic traces generated for each virtual user in each simulation. This telemetry information is similar to the slow-paced telemetry stream 81 that will be fed to the inference module 31. It can either consist of individual traffic streams (one stream per virtual user) or a single aggregated traffic stream (made of the sum of all the virtual users traffic streams in the simulated network).

The dataset-building module 333 receives the simulated speedtest values 335, the slow-paced telemetry information 336 and the set of configuration parameters 334 for a plurality of network simulations and outputs the synthetic traffic dataset 6. The synthetic traffic dataset 6 comprises the configuration parameters 334, simulated speedtest values 335 and slow-paced telemetry information 336 resulting from the network simulations.

Figure 8:
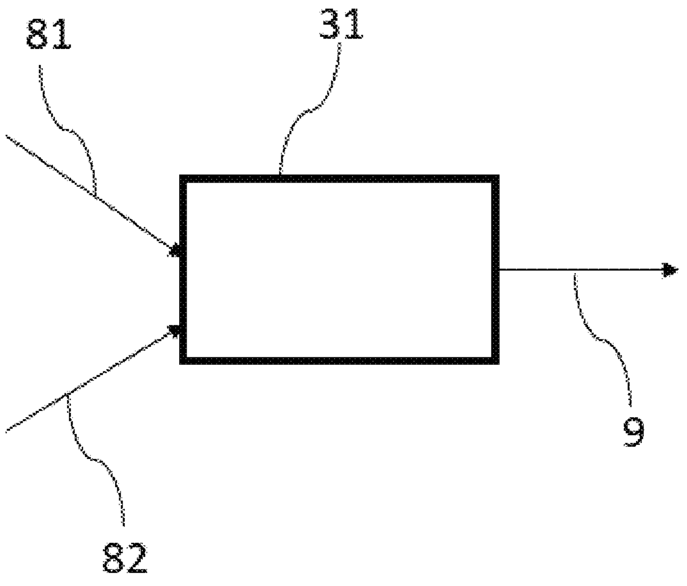
FIG. 8 represents a schematic view of the integration of the speedtest prediction apparatus within a network infrastructure according to an alternative embodiment.

According to an embodiment, the dataset-building module 333 outputs a plurality of datasets. For example, the simulated speedtest values may be grouped within a first dataset and the plurality of sets of configuration parameters 334 may be grouped within a second dataset. With reference to FIG. 8, the inference module 31 is represented. The inference module 31 integrates the speedtest prediction model 7, the speedtest prediction model 7 being trained within the training module 33 using the synthetic traffic dataset 6.

According to an embodiment, the inference module 31 receives a slow-paced telemetry data stream 81 and network data 82. The network data 82 may be provided by a network controller and may comprise a configuration of the network (a number of slices, subscribers, traffic schedulers and traffic shapers), a maximum bitrate per subscriber and a configuration of the Dynamic Bandwidth Management system.

The inference module 31 is configured to predict speedtest values 9 for all users of the telecommunications network 1 without actually performing a speedtest. Predictions are carried out with a period inferior to five minutes. Thus, the network controller may deduce whether the quality of service is satisfactory. The network controller may use the prediction to change a configuration of the Dynamic Bandwidth Management system.

Figure 9:
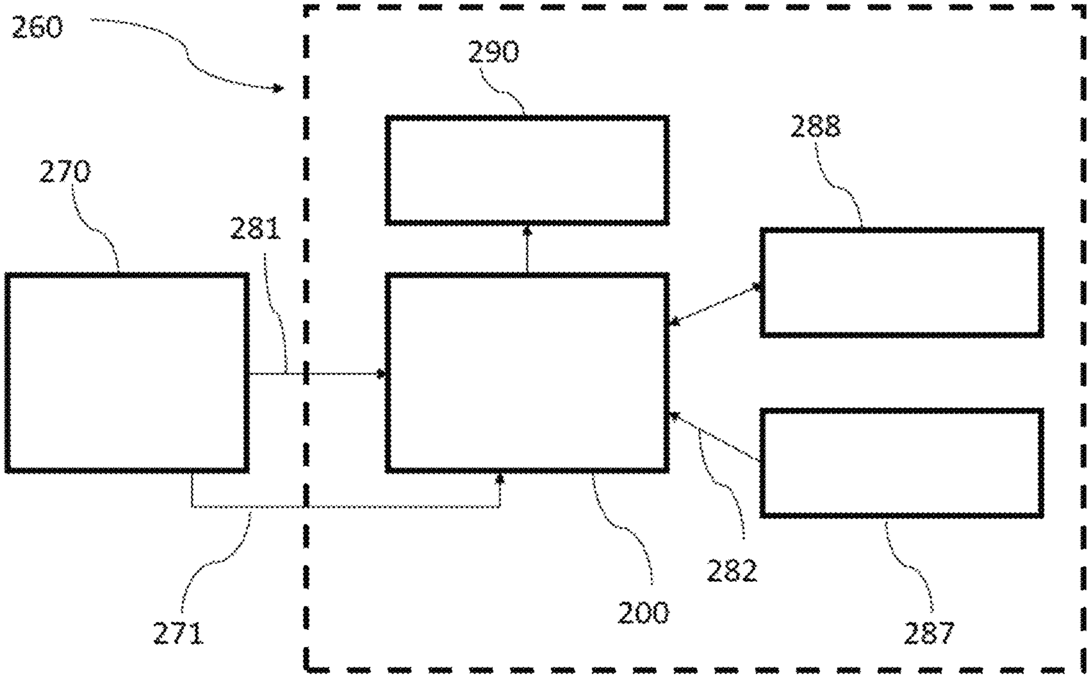
FIG. 9 is a functional diagram of a programmed computer in which example embodiments of the invention may be implemented.

With reference to FIG. 9, an implementation of a speedtest prediction apparatus 200 is represented. The speedtest prediction apparatus 200 is integrated within a network controller 260. The network controller 260 is a software application, deployed either on-premise or in the cloud. According to an embodiment, the network controller 260 may be a Software-Defined-Network (SDN) network controller.

The network controller 260 communicates with an access node 270. The access node 270 is a data communication equipment. According to an embodiment, the access node 270 may be a SDN access node.

The access node 270 retrieves a high-paced telemetry dataset 271 and a slow-paced telemetry data stream 281 from the telecommunications network 1.

The access node 270 transmits the high-paced telemetry dataset 271 and the slow-paced telemetry data stream 281 to the speedtest prediction apparatus 200. The speedtest prediction apparatus 200 comprises a speedtest prediction model, the speedtest prediction model being trained on the high-paced telemetry dataset 271.

The speedtest prediction model, once trained, predicts speedtest values for users of the telecommunications network. The speedtest prediction model takes as input the slow-paced telemetry data stream 281.

The network controller 260 also comprises a network inventory 287 and optionally a Dynamic Bandwidth Management system 288. The network inventory 287 stores network topology data and service-level agreement data. The network topology data and the service-level agreement data may be transmitted to the speedtest prediction apparatus for training and/or inference. The Dynamic Bandwidth Management system 288 may transmit bandwidth management data (such as scheduler weights) to the speedtest prediction apparatus 200.

The speedtest prediction apparatus 200 transmits predictions to a management user interface 290 to display results of the speedtest prediction across the telecommunications network 1 and to change values of parameters of the telecommunications network 1.

The speedtest prediction apparatus 200 may also transmit prediction to the Dynamic Bandwidth Management system 288, so that the Dynamic Bandwidth Management system 288 may update bandwidth management data.

Figure 10:
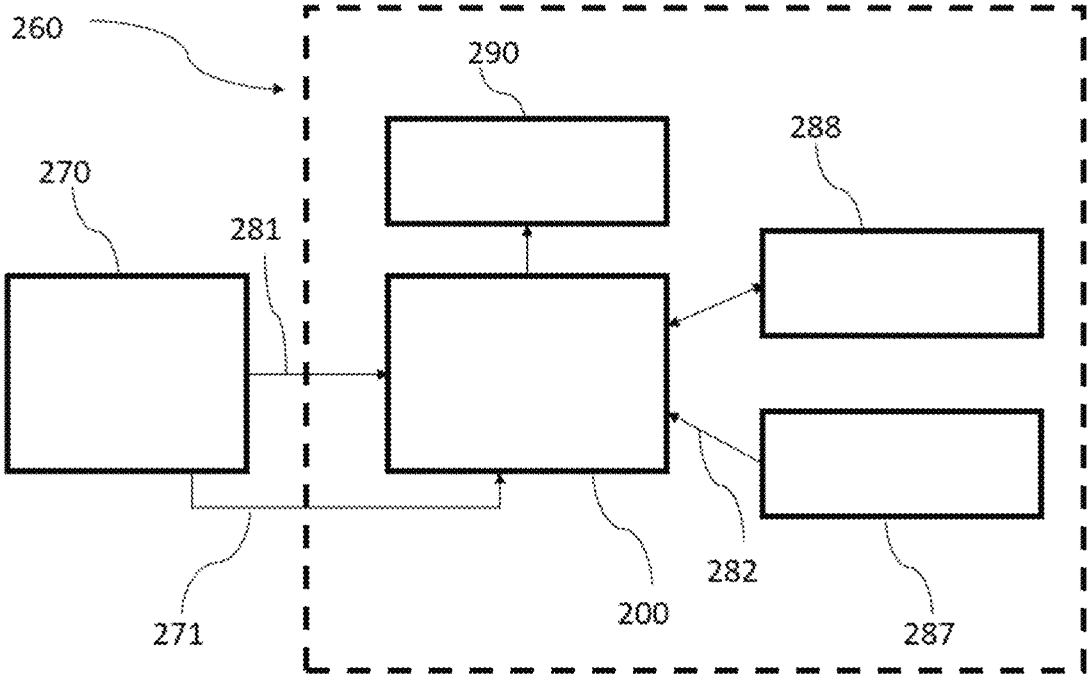
FIG. 10 is a model-building module according to example embodiments.

According to another embodiment, represented on FIG. 10, a model-building module 330 is not integrated within a network controller 360. An access node 370 transmits a high-paced telemetry dataset 371 to the model-building module 330.

The model-building module 330 outputs a trained speedtest prediction model 307, the trained speedtest prediction model 307 being then integrated within an inference module 331. The inference module 331 is integrated within the network controller 360.

The access node 370 also transmits a slow-paced telemetry data stream 381 to the inference module 331.

The network controller 360 also comprises a network inventory 387 and optionally a Dynamic Bandwidth Management system 388. The network inventory 387 may transmit network topology data and service-level agreement data to the inference module 331 for inference. The Dynamic Bandwidth Management system 388 may transmit bandwidth management data (such as scheduler weights) to the inference module 331. The inference module 331 may transmit speedtest prediction to a management user interface 390.

The speedtest prediction model 307 may be used as an off-the-shelf solution and may be deployed across several telecommunications networks. The speedtest prediction model 307 may be retrained and fine-tuned for a given network configuration.

Figure 11:
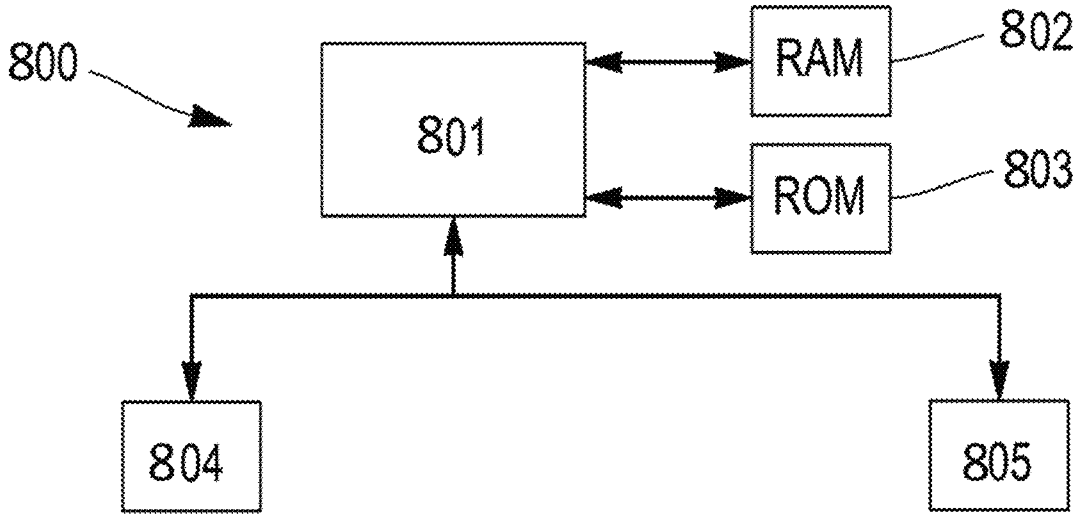
FIG. 11 is a functional diagram of a programmed computer, server, circuitry, or apparatus in which example embodiments of the invention may be implemented.

FIG. 11 shows a functional diagram of a programmed computer, server, circuitry, or apparatus 800 that may be used for that purpose. Computer 800 has a core and several peripherals connected via a communication bus. The major components of the core are a microprocessor 801 (often called the CPU) random access memory (RAM) 802 and read only memory (ROM) 803. The peripherals comprise devices that allow information to be input to the system from users, output to users and stored and retrieved (mass storage devices 804 such as hard disks and network interfaces 805).

The invention is not limited to the described example embodiments. The appended claims are to be construed as embodying all modifications and alternative constructions that may occur to one skilled in the art, and which fairly fall within the basic teaching as set forth herein.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation."

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Elements such as the apparatus and its components could be or include e.g. hardware means like e.g. an Application-Specific Integrated Circuit (ASIC), or a combination of hardware and software means, e.g. an ASIC and a Field-Programmable Gate Array (FPGA), or at least one microprocessor and at least one memory with software modules located therein, e.g. a programmed computer.

The use of the verb "to comprise" or "to include" and its conjugations does not exclude the presence of elements or steps other than those stated in a claim. Furthermore, the use of the article "a" or "an" preceding an element or step does not exclude the presence of a plurality of such elements or steps. The example embodiments may be implemented by means of hardware as well as software. The same item of hardware may represent several "means".

In the claims, any reference signs placed between parentheses shall not be construed as limiting the scope of the claims.

The invention claimed is:

1. An apparatus for building a prediction model adapted to predict a value of a metric of a quality of a point-to-multipoint telecommunications network, the apparatus comprising means for:

Collecting a plurality of high-paced telemetry traffic measurement values representing traffic rates observed in a shared medium of the point-to-multipoint telecommunications network, wherein the shared medium is shared by a plurality of users of the point-to-multipoint telecommunications network and wherein the high-paced telemetry traffic measurement values represent traffic rates attributed to individual users among the plurality of users, Fitting at least one traffic model using the plurality of high-paced telemetry traffic measurement values and computing at least one simulated value of the metric of the quality of the point-to-multipoint telecommunications network using the traffic model and a descriptor of at least one network configuration, wherein the metric of the quality of the point-to-multipoint telecommunications network relates to at least one individual user of the point-to-multipoint telecommunications network, Training a prediction model on a simulated dataset, wherein the simulated dataset comprises the descriptor of at least one network configuration and the at least one simulated value of the metric of the quality of the point-to-multipoint telecommunications network, the prediction model being configured to compute the value of the metric of the quality of the point-to-multipoint telecommunications network.

2. An apparatus according to claim 1, wherein the plurality of high-paced telemetry traffic measurement values is retrieved from a minority of users of the point-to-multipoint telecommunications network.

3. An apparatus according to claim 1 wherein the descriptor of at least one network configuration comprises at least one value relating to a dynamic bandwidth management system.

4. An apparatus according to claim 1, wherein the at least one simulated value of the metric of the quality of the point-to-multipoint telecommunications network comprises a plurality of simulated values of the metric of the quality of the point-to-multipoint telecommunications network, wherein the metric of the quality of the point-to-multipoint telecommunications network is selected in the group consisting of data rates, latencies and speedtest results.

5. An apparatus according to claim 1, wherein the apparatus further comprises means for:

Extracting a plurality of elementary segments from the plurality of high-paced telemetry traffic measurement values, Clustering the plurality of elementary segments into a plurality of clusters of elementary segments, Fitting a plurality of cluster traffic models on the plurality of clusters of elementary segments, wherein the at least one simulated value of the metric of the quality of the point-to-multipoint telecommunications network is computed using at least one of the plurality of cluster traffic models and the descriptor of at least one network configuration.

6. An apparatus according to claim 1, wherein the at least one traffic model comprises a Discrete Auto Regressive model.

7. An apparatus according to claim 1, wherein the at least one network configuration comprises a plurality of network configurations and the at least one simulated value of the metric of the quality of the point-to-multipoint telecommunications network comprises a plurality of simulated values of the metric of the quality of the point-to-multipoint telecommunications network.

8. An apparatus according to claim 1, wherein the prediction model comprises a classifier.

9. An apparatus according to claim 1, wherein the prediction model comprises a regression model.

10. An apparatus according to claim 1, wherein the point-to-multipoint telecommunications network is a Passive Optical Network.

11. An apparatus according to claim 1, wherein the prediction model computes a probability of success of a speedtest.

12. An apparatus according to claim 1, wherein the prediction model computes a speedtest rate.

13. A method for building a prediction model adapted to predict a value of a metric of a quality of a point-to-multipoint telecommunications network, the method comprising the steps of:

Collecting a plurality of high-paced telemetry traffic measurement values representing traffic rates observed in a shared medium of the point-to-multipoint telecommunications network, wherein the shared medium is shared by a plurality of users of the point-to-multipoint telecommunications network and wherein the high-paced telemetry traffic measurement values represent traffic rates attributed to individual users among the plurality of users, Fitting at least one traffic model using the plurality of high-paced telemetry traffic measurement values and computing at least one simulated value of the metric of the quality of the point-to-multipoint telecommunications network using the traffic model and a descriptor of at least one network configuration, wherein the metric of the quality of the point-to-multipoint telecommunications network relates to at least one individual user of the point-to-multipoint telecommunications network, and Training a prediction model on a simulated dataset, wherein the simulated dataset comprises the descriptor of at least one network configuration and the at least one simulated value of the metric of the quality of the point-to-multipoint telecommunications network, the prediction model being configured to compute the value of the metric of the quality of the point-to-multipoint telecommunications network.

14. An apparatus for predicting a value of a metric of a quality of a point-to-multipoint telecommunications network, the apparatus comprising means for:

Collecting a real-time telemetry traffic measurement value,

Using the prediction model built according to the method according to claim 13 to predict a value of the metric of the quality of the point-to-multipoint telecommunications network.

15. A method for predicting a value of a metric of a quality of a point-to-multipoint telecommunications network, the method comprising the steps of:

Collecting a real-time telemetry traffic measurement value,

Using the prediction model built according to the method according to claim 13 to predict a value of the metric of the quality of the point-to-multipoint telecommunications network.

* * * * *